US012709102B2

(12) United States Patent
Sasaki et al.

(10) Patent No.: US 12,709,102 B2
(45) Date of Patent: Aug. 18, 2026

(54) LIQUID EJECTING HEAD AND LIQUID EJECTING APPARATUS

(71) Applicant: CANON KABUSHIKI KAISHA, Tokyo (JP)

(72) Inventors: Tatsuki Sasaki, Kanagawa (JP); Yuji Tamaru, Tokyo (JP); Shinichiro Matsumoto, Kanagawa (JP); Takuhiro Ogushi, Kanagawa (JP); Hisao Okita, Kanagawa (JP); Tomoo Izumi, Kanagawa (JP); Kimiyuki Hayasaki, Kanagawa (JP); Kenjiro Watanabe, Tokyo (JP); Chiaki Muraoka, Saitama (JP); Yosuke Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 18/825,706

(22) Filed: Sep. 5, 2024

(65) Prior Publication Data

US 2025/0074068 A1 Mar. 6, 2025

(30) Foreign Application Priority Data

Sep. 6, 2023 (JP) ................................ 2023-144285

(51) Int. Cl.
*B41J 2/175* (2006.01)
*B41J 2/045* (2006.01)
*B41J 2/14* (2006.01)

(52) U.S. Cl.
CPC ........... *B41J 2/17596* (2013.01); *B41J 2/045* (2013.01); *B41J 2002/14491* (2013.01)

(58) Field of Classification Search
CPC .................. B41J 2/17596; B41J 2/045; B41J 2002/14491
USPC ........................................................ 347/20
See application file for complete search history.

(56) References Cited

U.S. PATENT DOCUMENTS 10,160,223 B2 12/2018 Kaneko et al.
2010/0328400 A1* 12/2010 Koda .................. B41J 2/14274 347/50

FOREIGN PATENT DOCUMENTS

JP 2018-030350 A 3/2018
JP 2018125458 A * 8/2018

* cited by examiner

*Primary Examiner* — Mark Edwards
(74) *Attorney, Agent, or Firm* — Venable LLP

(57) ABSTRACT

A liquid ejecting head capable of ejecting a liquid includes a storage unit; an element substrate which includes ejection nozzles for ejecting the liquid supplied from the storage unit; a drive unit configured to drive the element substrate, which is supplied with electric power at a predetermined voltage; a housing configured to support the element substrate, the storage unit, and the drive unit; an electric circuit board in which a high-voltage wiring to which the predetermined voltage is applied is disposed; and a flame retardant portion which has a flame retardant grade of V-1 or more. The electric circuit board includes a core member which has a flame retardant grade of V-1 or more. The flame retardant portion is disposed on a side closer to the housing than the electric circuit board. The high-voltage wiring is disposed between the core member and the flame retardant portion.

16 Claims, 11 Drawing Sheets

LIQUID EJECTING HEAD AND LIQUID EJECTING APPARATUS

BACKGROUND

Field of the Disclosure

The present disclosure relates to a liquid ejecting head and a liquid ejecting apparatus.

Description of the Related Art

Japanese Patent Laid-Open No. 2018-030350 discloses a drive waveform which is generated by a circuit for driving a pump included in an inkjet head (liquid ejecting head). By referring to this drive waveform, it can be understood that a voltage of 120 V to 300 V is applied to this circuit. In a liquid ejecting head having a configuration in which electric power is supplied at relatively high voltage in this way, there is also a case where an unexpected event occurs due to a member to which relatively high voltage is applied.

However, Japanese Patent Laid-Open No. 2018-030350 mentions nothing about electrical safety for a liquid ejecting head.

SUMMARY

An object of the present disclosure is to provide a liquid ejecting head which can achieve electrical safety.

In an aspect of the present disclosure, there is provided a liquid ejecting head capable of ejecting a liquid, including a storage unit which is capable of storing the liquid; an element substrate which includes a plurality of ejection nozzles for ejecting the liquid supplied from the storage unit; a drive unit configured to drive the element substrate, which is supplied with electric power at a predetermined voltage; a housing configured to support the element substrate, the storage unit, and the drive unit; an electric circuit board in which a high-voltage wiring to which the predetermined voltage is applied is disposed; and a flame retardant portion which has a flame retardant grade of V−1 or more, wherein the electric circuit board includes a core member which has a flame retardant grade of V−1 or more, the flame retardant portion is disposed on a side closer to the housing than the electric circuit board, and the high-voltage wiring is disposed between the core member and the flame retardant portion.

Further features of the present disclosure will become apparent from the following description of exemplary embodiments with reference to the attached drawings.

DESCRIPTION OF THE EMBODIMENTS

First Embodiment

Hereinafter, examples of embodiments in the present disclosure will be described by using the drawings. However, the following description does not limit the scope of the present disclosure.

<Description of Liquid Ejecting Apparatus>

Figure 1:
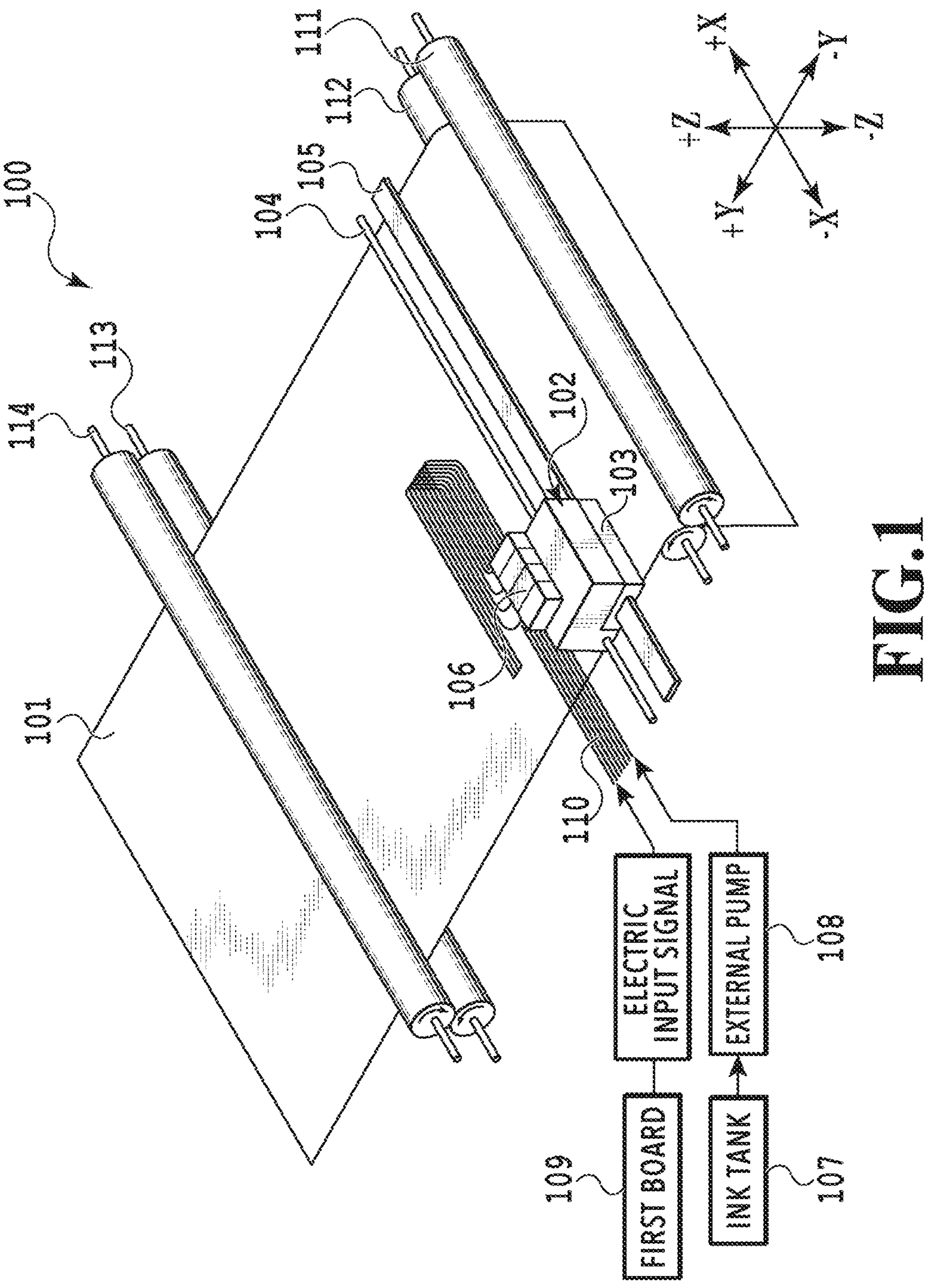
FIG. 1 is an external perspective diagram showing an example of a liquid ejecting apparatus which can be used in one embodiment.

FIG. 1 is an external perspective diagram showing an example of a liquid ejecting apparatus 100 which can be used in the present embodiment.

The coordinate axes in the drawings will be described. In the drawings referred to in the present specification, an X direction and a Y direction indicate two directions orthogonal to each other on a horizontal plane. A Z direction indicates a vertical direction. A +Y direction indicates the front side of the liquid ejecting apparatus 100, a −Y direction indicates the rear side, a −X direction indicates the left side, a +X direction indicates the right side, a +Z direction indicates the upper side, and a −Z direction indicates the lower side, respectively. The +Y direction is also downstream in a conveyance direction of a sheet 101, and the −Y direction is also upstream in the conveyance direction of the sheet 101. The X direction is called a scanning direction as appropriate. In the following description, upward, downward, left, and right indicate directions in used orientation in which the liquid ejecting apparatus 100 is used in a normal state.

The present embodiment will be described on the assumption that the "liquid" is an ink. However, the liquid which can be used in the present embodiment is not limited to an ink. That is, as the liquid, various printing liquids including treatment liquids used for the purpose of improving the fixability of an ink on a printing medium, reducing glossy unevenness, or improving scratch resistance.

The present embodiment will be described on the assumption that the "printing medium" is the sheet 101 which is used in a general liquid ejecting apparatus. However, the "printing medium" is not limited as long as the printing medium is a medium which can receive a liquid. Other examples of the "printing medium" include cloth, a plastic film, a metal plate, glass, ceramics, resin, wood, leather, or the like.

"Printing" does not mean only forming significant information such as characters and figures. "Printing" also means forming insignificant information such as an image, design, or pattern. Moreover, it does not matter whether or not "printing" is so visualized that it can be visually perceived by humans. That is, "printing" also means forming a structure on the sheet 101 or processing the medium.

As shown in FIG. 1, the present embodiment will be described on the assumption that the liquid ejecting apparatus 100 is a so-called inkjet printer which ejects ink with a serial system. The liquid ejecting apparatus 100 includes a liquid ejecting head 102 which is capable of ejecting ink onto the sheet 101. The liquid ejecting head 102 can be attached to and detached from a carriage 103 which is capable of reciprocating in the scanning direction (+X direction). The carriage 103 is supported by a guide shaft 104 which extends in the scanning direction such that the carriage 103 can slide along the guide shaft 104. The carriage 103 is fixed to an endless belt 105 disposed in parallel with the guide shaft 104.

In the state where the carriage 103 is fixed to the endless belt 105, an ejection nozzle face of the liquid ejecting head 102, in which ejection nozzles (not shown in FIG. 1) for ejecting the inks are formed, is held in the state of facing, in parallel, a not-shown platen which supports the sheet 101 from the −Z direction side. A drive pulley (not shown) is rotated by driving of a carriage motor 205 (see FIG. 2). Forward rotation and reverse rotation of the drive pulley move the endless belt 105 in the left direction (−X direction) and the right direction (+X direction). As the endless belt 105 is moved along the scanning direction in this way, the carriage 103 also reciprocates along the guide shaft 104 along the scanning direction.

Circulating units 106, the number of which corresponds to the number of types of liquids which the liquid ejecting head 102 can eject, are mounted on the liquid ejecting head 102. In the present embodiment, the liquid ejecting head 102 is capable of ejecting inks of four colors, cyan, magenta, yellow, and black. Hence, four circulating units 106 corresponding, respectively, to these four colors are mounted on the liquid ejecting head 102. The liquid ejecting head 102 configured in this way is capable of full color printing using these inks of four colors. Note that colors of inks which can be applied to the present embodiment are not limited to the above-mentioned four colors.

The liquid ejecting apparatus 100 includes an ink tank 107 which is disposed at a position away from the liquid ejecting head 102 and an external pump 108 for supplying the inks from the ink tank 107 to the circulating units 106. Tubes for supplying the inks from the ink tank 107 via the external pump 108, pipes for supplying the air, and the like are connected to the liquid ejecting head 102. These tubes and pipes are guided along a guide 110 to the liquid ejecting head 102.

Inside the liquid ejecting apparatus 100, a first board 109 in which electric wirings for various uses are routed is disposed. A wiring for sending electric signals for driving the liquid ejecting head 102 is connected to the carriage 103. This wiring is also guided along the guide 110 to the liquid ejecting head 102.

The liquid ejecting apparatus 100 includes a conveyance unit for conveying the sheet 101 in the conveyance direction. In the present embodiment, the conveyance direction is defined as a direction (+Y direction) orthogonal to the scanning direction. The conveyance unit is driven by a conveyance motor 207 (see FIG. 2). The conveyance unit includes a first conveyance roller 111, a second conveyance roller 112, a third conveyance roller 113, and a fourth conveyance roller 114. Each of the conveyance motors for driving these respective conveyance rollers can be rotated in both forward and reverse directions.

The first conveyance roller 111 and the second conveyance roller 112 are capable of holding the sheet 101 in between on the upstream side (−Y direction side) of the carriage 103 in the conveyance direction. The third conveyance roller 113 and the fourth conveyance roller 114 are capable of holding the sheet 101 in between on the downstream side (+Y direction side) of the carriage 103 in the conveyance direction.

The first conveyance roller 111 and the second conveyance roller 112 rotate in directions opposite to each other in the state of holding the sheet 101 in between. The third conveyance roller 113 and the fourth conveyance roller 114 rotate in directions opposite to each other in the state of holding the sheet 101 in between. The sheet 101 is conveyed in the conveyance direction (+Y direction) by such rotations of the conveyance unit.

The liquid ejecting apparatus 100 conducts printing by ejecting the inks while intermittently moving the sheet 101 to the downstream side (+Y direction side) in the conveyance direction and also moving the liquid ejecting head 102 in the scanning direction. Hereinafter, such an operation of the liquid ejecting head 102 is referred to as a printing operation.

The liquid ejecting apparatus 100 includes a recovery unit (not shown) for maintaining and recovering the ejection performance of the ejection nozzles. The recovery unit is disposed within a region where the liquid ejecting head 102 can move and at a position away from the conveyance path of the sheet 101. When the printing operation is not conducted, a cap included in the recovery unit is relatively moved to a position of covering the ejection nozzle face of the liquid ejecting head 102 in which the ejection nozzles are formed. Covering the ejection nozzle face with the cap can suppress drying of the ejection nozzles. In the state where the ejection nozzle face is covered with the cap, the inks are added. Moreover, in the state where the ejection nozzle face is covered with the cap, sucking the inks remaining near the ejection nozzles can suppress the clogging of the inks and thickening of the inks.

<Control System of Liquid Ejecting Apparatus 100>

Figure 2:
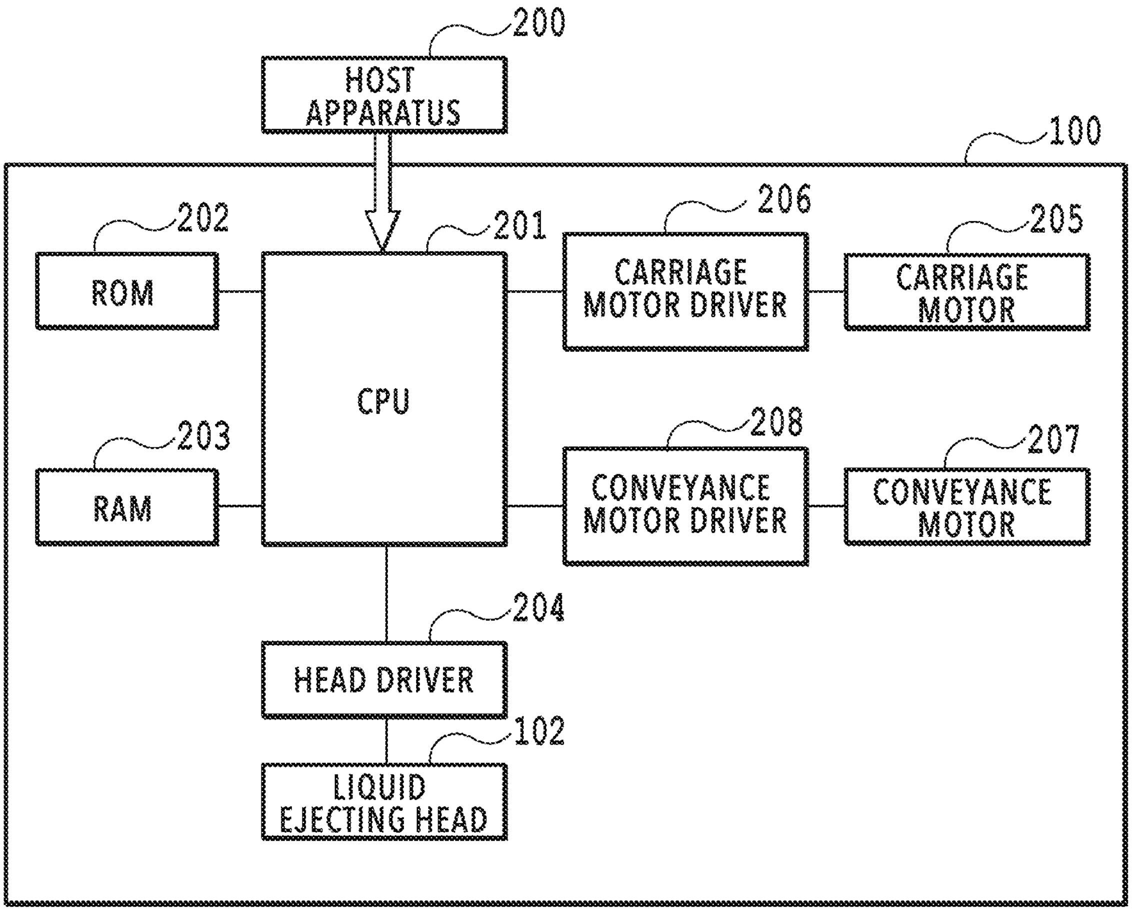
FIG. 2 is a block diagram showing a control system of the liquid ejecting apparatus in one embodiment.

FIG. 2 is a block diagram showing a control system of the liquid ejecting apparatus 100 in the present embodiment.

As shown in FIG. 2, outside the liquid ejecting apparatus 100, a host apparatus 200 which is capable of instructing execution of the printing operation to the liquid ejecting apparatus 100 is disposed.

The liquid ejecting apparatus 100 includes a CPU 201 for controlling the entire apparatus, a ROM 202 which stores programs executed by the CPU 201 and various parameters, and a RAM 203 which can be used as a storage unit.

The liquid ejecting apparatus 100 includes a head driver 204 for driving the liquid ejecting head 102. The liquid ejecting apparatus 100 includes the carriage motor 205 for driving the carriage 103 (see FIG. 1) and a carriage motor driver 206 for controlling the carriage motor 205. The liquid ejecting apparatus 100 includes the conveyance motor 207 for driving the conveyance unit and a conveyance motor driver 208 for controlling the conveyance motor 207.

In the host apparatus 200, a printer driver is installed for gathering print information such as a printed image and a printed image quality and communicating with the liquid ejecting apparatus 100 in the case where execution of the printing operation has been instructed by the user. The CPU 201 is configured to be capable of transmitting and receiving various data (for example, a print image and the like) to and from the host apparatus 200.

The CPU 201 functions as a control unit which controls the entire liquid ejecting apparatus 100 including the liquid ejecting head 102, such as the operation of each unit and data processing. The ROM 202 is configured to be capable of storing the programs executed by the CPU 201 and various data. The RAM 203 temporarily stores process data executed by the CPU 201 and data received from the host apparatus 200.

<Description of Liquid Ejecting Head 102>

Figure 3:
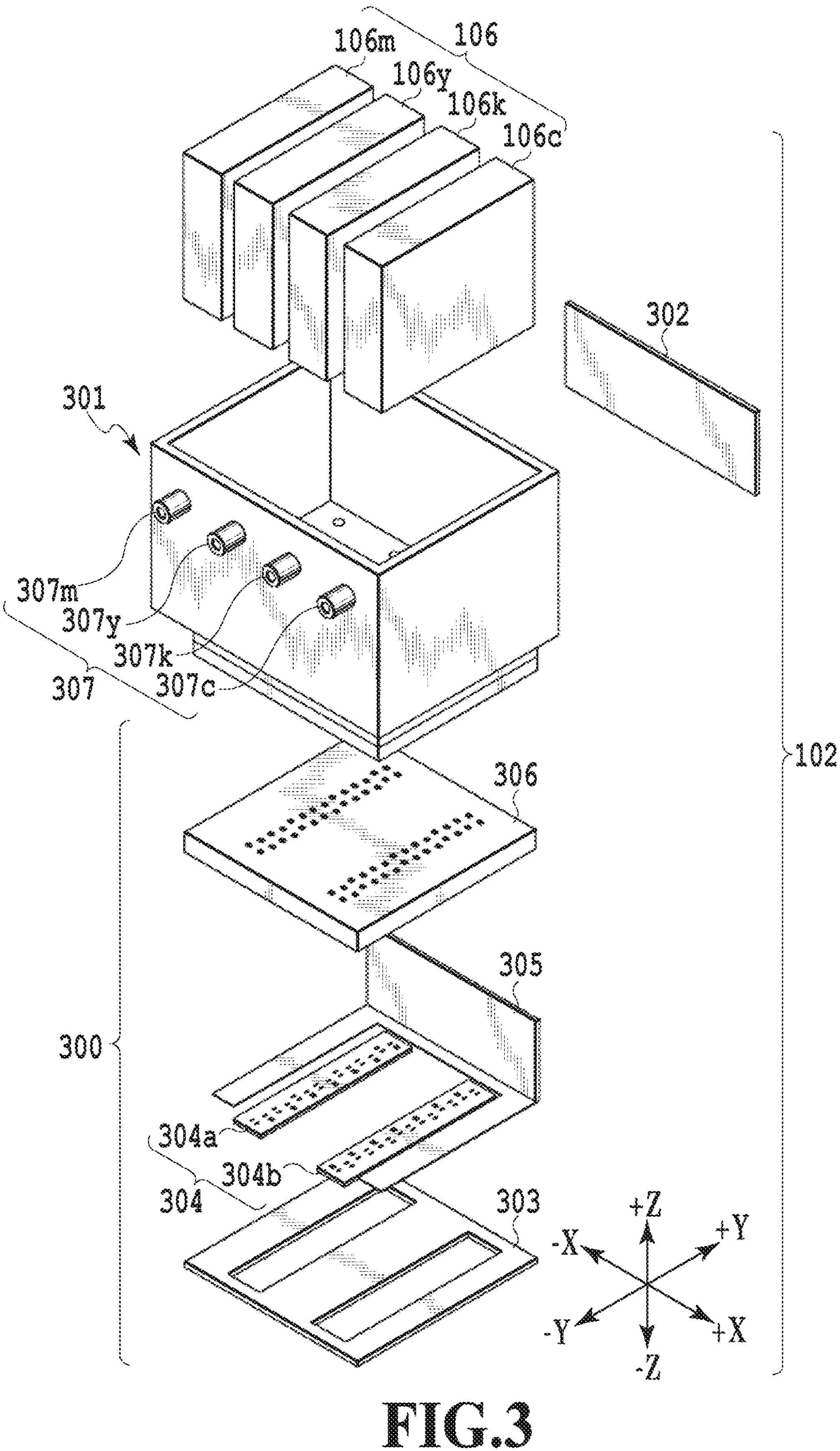
FIG. 3 is an exploded perspective diagram of a liquid ejecting head of one embodiment.

FIG. 3 is an exploded perspective diagram of the liquid ejecting head 102 of the present embodiment.

As shown in FIG. 3, the liquid ejecting head 102 includes an ejection unit 300 for ejecting the inks, a housing 301 which is capable of housing the circulating units 106, the circulating units 106 themselves, and an electric circuit board 302, which is fixed to the housing 301. The ejection unit 300 includes a face cover 303 which is capable of covering part of the bottom face of the liquid ejecting head 102 and element substrates 304, which include predetermined elements.

The element substrate 304 includes a first element substrate 304*a* and a second element substrate 304*b*. The first element substrate 304*a* is capable of ejecting liquids of a first type and a second type. The second element substrate 304*b* is capable of ejecting liquids of a third type and a fourth type. In the case where there is no need to particularly distinguish the first element substrate 304*a* and the second element substrate 304*b*, these are called element substrates 304.

The ejection unit 300 includes a connection board 305 which is capable of electrically connecting the electric circuit board 302 and the element substrates 304 and a support member 306 for supporting the element substrates 304.

In the present embodiment, flow passages for supplying the inks, which are supplied from the ink tank 107 (see FIG. 1), to the ejection unit 300 are formed in the back face (the face directed in the −Y direction in the present embodiment) and the bottom portion of the housing 301. In the back face of the housing 301, connection parts 307 are formed as the flow passages for supplying the inks, which are supplied from the ink tank 107 (see FIG. 1), to the circulating units 106. To the connection parts 307, end portions of tubes guided from the ink tank 107 (see FIG. 1) along the guide 110 (see FIG. 1) are connected.

In the present embodiment, the connection parts 307 include a first connection part 307*m*, a second connection part 307*y*, a third connection part 307*k*, and a fourth connection part 307*c*. The tube for supplying the ink of magenta is connected to the first connection part 307*m*. The tube for supplying the ink of yellow is connected to the second connection part 307*y*. The tube for supplying the ink of black is connected to the third connection part 307*k*. The tube for supplying the ink of cyan is connected to the fourth connection part 307*c*. Hereinafter, in the case where there is no need to particularly distinguish the first connection part 307*m*, the second connection part 307*y*, the third connection part 307*k*, and the fourth connection part 307*c*, these are called the connection parts 307.

The circulating units 106 include a first circulating unit 106*m*, a second circulating unit 106*y*, a third circulating unit 106*k*, and a fourth circulating unit 106*c* corresponding to the respective inks of four colors, magenta, yellow, black, and cyan. Hereinafter, in the case where there is no need to particularly distinguish the first circulating unit 106*m*, the second circulating unit 106*y*, the third circulating unit 106*k*, and the fourth circulating unit 106*c*, these are called the circulating units 106.

The first connection part 307*m* is connected to the first circulating unit 106*m*. The second connection part 307*y* is connected to the second circulating unit 106*y*. The third connection part 307*k* is connected to the third circulating unit 106*k*. The fourth connection part 307*c* is connected to the fourth circulating unit 106*c*.

In the bottom portion of the housing 301, flow passages for supplying the inks, which are supplied from the circulating units 106, to the ejection unit 300 are formed. In this way, the inks supplied to the connection parts 307 are supplied to the ejection unit 300 via the circulating units 106 and the flow passages formed in the bottom portion of the housing 301.

To the bottom face of the housing 301, an upper face of the support member 306 is joined. In the support member 306, a plurality of through-holes which penetrate the support member 306 in the vertical direction (Z direction) are formed. In the support member 306, through-holes capable of supplying the ink of magenta and through-holes capable of supplying the ink of yellow from the housing 301 to the first element substrate 304*a* are formed. In the support member 306, through-holes capable of supplying the ink of black and through-holes capable of supplying the ink of cyan from the housing 301 to the second element substrate 304*b* are formed.

To a bottom face of the support member 306, upper faces of the element substrates 304 are joined. In the element substrate 304, a plurality of openings which are capable of being connected to the plurality of through-holes formed in the support member 306 are formed. Such a configuration allows the inks supplied to the circulating units 106 to be supplied to the element substrate 304 via the flow passages formed in the bottom portion of the housing 301 and the through-holes formed in the support member 306.

In addition, to a front face (a face directed in the +Y direction in the present embodiment) of the housing 301, the electric circuit board 302 is fixed. The electric circuit board 302 has a face (a face directed in the −Y direction) which is fixed to the housing 301 and a contact face (a face directed in the +Y direction) which is directed in the opposite direction. Such a configuration allows electric signals transmitted from the apparatus main body to the contact face of the electric circuit board 302 to be transmitted to the element substrate 304 via the connection board 305.

In the ejection nozzle face of the element substrate 304, an ejection nozzle array in which a plurality of ejection nozzles capable of ejecting the ink supplied from the circulating unit 106 are disposed along the Y direction is formed. At positions corresponding to the plurality of ejection nozzles, energy generating elements (for example, heaters) which apply energy to the ink for ejecting the ink are disposed. These energy generating elements are driven by the head driver 204 (see FIG. 2) in accordance with electric signals input into the connection board 305. By driving the energy generating elements in accordance with the electric signals in this way, the ink is ejected from the element substrate 304. The element substrate 304 is not covered with the face cover 303.

In the present embodiment, in the case where the ink of magenta is supplied to the first element substrate 304*a*, the ink of magenta is ejected from a first ejection nozzle array, and in the case where the ink of yellow is supplied thereto, the ink of yellow is ejected from a second ejection nozzle array. In the case where the ink of black is supplied to the second element substrate 304*b*, the ink of black is ejected from a third ejection nozzle array, and in the case where the ink of cyan is supplied thereto, the ink of cyan is ejected from a fourth ejection nozzle array. To a lower face (a face directed in the −Z direction) of the connection board 305, an upper face (a face directed in the +Z direction) of the face cover 303 is joined.

The face cover 303 can protect the ejection nozzle face of the element substrate 304 from scratching of a wiper in the case of wiping, paper scratching at the time of printing operation, and the like.

<Description of Circulation Path>

Figure 4:
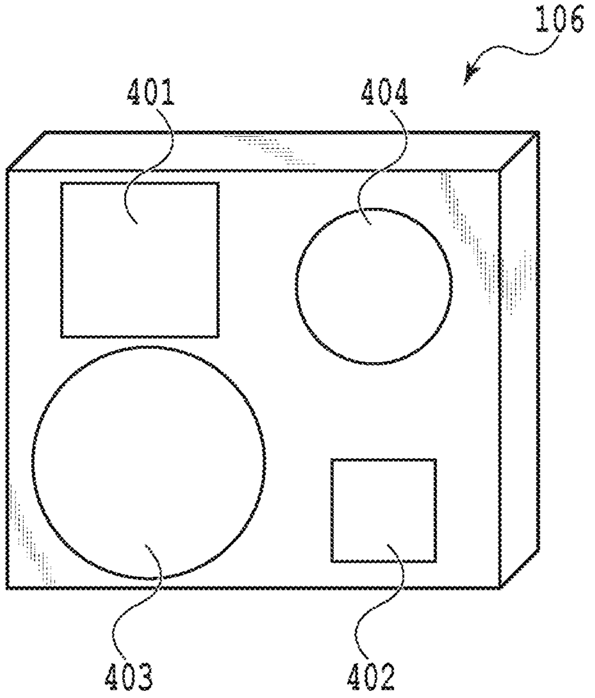
FIG. 4 is a schematic diagram of a circulating unit which can be applied to one embodiment.

FIG. 4 is a schematic diagram of the circulating unit 106 which can be applied to the present embodiment. As mentioned above, the circulating unit 106 includes the first circulating unit 106*m*, the second circulating unit 106*y*, the third circulating unit 106*k*, and the fourth circulating unit 106*c*. For convenience of description, one of the first circulating unit 106*m*, the second circulating unit 106*y*, the third circulating unit 106*k*, and the fourth circulating unit 106*c* will be described as an example in FIG. 4. The configurations of the first circulating unit 106*m*, the second circulating unit 106*y*, the third circulating unit 106*k*, and the fourth circulating unit 106*c* are all the same except for the colors of the inks circulated.

As shown in FIG. 4, the circulating unit 106 includes a filter 401 which is capable of removing dust and the like in the ink and a drive unit which is driven by electric power supplied via the electric circuit board 302 (see FIG. 3).

In the present embodiment, a circulating pump 402 is used as the drive unit. The circulating pump 402 is a piezoelectric diaphragm pump capable of sending a liquid by alternately moving two check valves with change in pressure by inputting drive voltage to a piezoelectric element attached to a diaphragm to change the volume in a pump chamber.

The circulating unit 106 includes a first pressure control mechanism 403 as a first pressure control unit and a second pressure control mechanism 404 as a second pressure control unit. The first pressure control mechanism 403 and the second pressure control mechanism 404 also function as storage units capable of temporarily storing a liquid inside.

Figure 5:
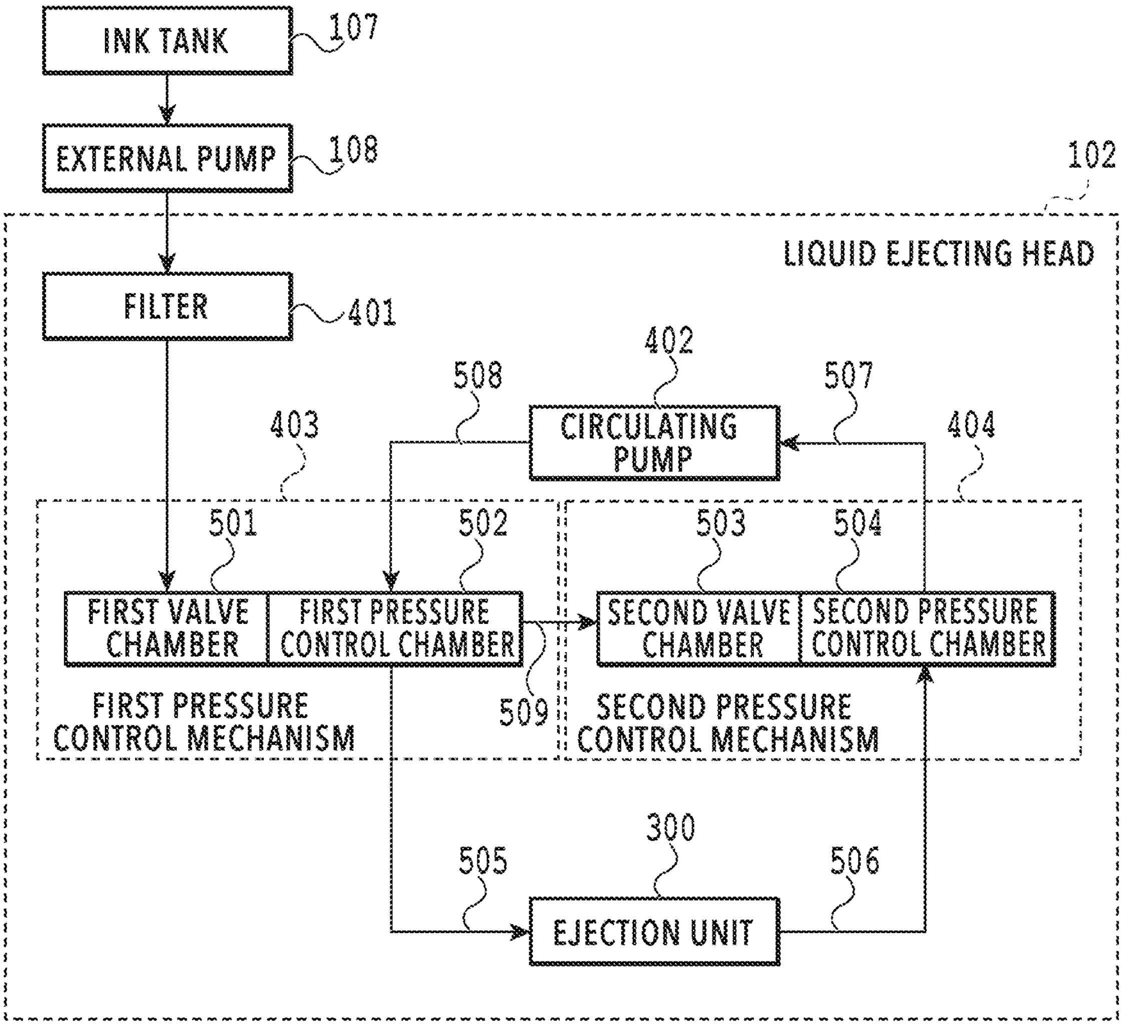
FIG. 5 is a schematic diagram showing a circulation path which can be applied to one embodiment.

FIG. 5 is a schematic diagram showing circulation paths which can be applied to the present embodiment. In the present embodiment, there are four circulation paths. For convenience of description, one of the four circulation paths will be described as an example in FIG. 5. The configurations of these four circulation paths are all the same except for the colors of the inks circulated.

As shown in FIG. 5, the first pressure control mechanism 403 includes a first valve chamber 501 and a first pressure control chamber 502 which are connected to each other via a first valve (not shown). The second pressure control mechanism 404 includes a second valve chamber 503 and a second pressure control chamber 504 which are connected to each other via a second valve (not shown).

The first pressure control chamber 502 and the ejection unit 300 are connected via a supply flow passage 505 formed in the bottom portion of the housing 301 (see FIG. 2). The ejection unit 300 and the second pressure control chamber 504 are connected via a recovery flow passage 506 formed in the bottom portion of the housing 301 (see FIG. 2). The second pressure control chamber 504 and the circulating pump 402 are connected via a pump inlet flow passage 507 formed on the upstream side of the circulating pump 402. The circulating pump 402 and the first pressure control chamber 502 are connected via a pump outlet flow passage 508 formed on the downstream side of the circulating pump 402. The first pressure control chamber 502 and the second valve chamber 503 are connected via a bypass flow passage 509.

In this way, the circulation paths which are capable of circulating the ink are formed inside the liquid ejecting head 102. The circulation paths of the present embodiment mean paths which extend from the first pressure control mechanism 403 and return to the first pressure control mechanism 403 again through the ejection unit 300, the second pressure control mechanism 404, and the circulating pump 402.

<Circulation of Ink>

In the case where the ink is circulated, the ink is supplied with pressure from the ink tank 107 to the first valve chamber 501 via the filter 401 by driving of the external pump 108. The filter 401 removes dust and the like in the ink.

Thereafter, the pressure is adjusted such that the ink is supplied from the first valve chamber 501 to the first pressure control chamber 502. Specifically, once the ink is supplied to the first valve chamber 501, the circulating pump 402 is driven to supply the ink from the pump inlet flow passage 507 to the pump outlet flow passage 508. The driving of the circulating pump 402 controls the pressure inside the first pressure control chamber 502.

By controlling the pressure inside the first pressure control chamber 502, the ink is supplied from the first pressure control chamber 502 to the ejection unit 300 via the supply flow passage 505, and is also supplied to the second valve chamber 503 via the bypass flow passage 509.

The ink supplied to the ejection unit 300 is supplied to the second pressure control mechanism 404 via the flow passage formed in the support member 306, the flow passage formed inside the element substrate 304 (see FIG. 3), and the recovery flow passage 506. Specifically, in the element substrate 304, the ink passes through a pressure chamber formed inside the element substrate 304. An ejection nozzle is formed to continue from this pressure chamber. Energy generating elements are disposed at positions corresponding to the ejection nozzles.

The ink supplied from the first pressure control chamber 502 to the second valve chamber 503 is supplied to the second pressure control chamber 504, which is connected to the second valve chamber 503 via the second valve.

The ink supplied to the second pressure control chamber 504 is supplied to the first pressure control chamber 502 via the pump inlet flow passage 507, the circulating pump 402, and the pump outlet flow passage 508.

In this way, in the present embodiment, by driving the circulating pump 402, the ink can be circulated between the first valve chamber 501 and the ejection unit 300. By circulating the ink in this way, the thickening of the ink inside the element substrate 304 (see FIG. 3) can be suppressed. Note that as long as the thickening of the ink can be suppressed, the circulation paths do not necessarily have to include the pressure chamber of the element substrate 304. The circulation paths only have to be formed in such a manner as to circulate the ink inside the ejection unit 300 to such an extent that the thickening of the ink present near the energy generating elements can be suppressed.

<Configuration for Driving Circulating Pump 402>

Figure 6:
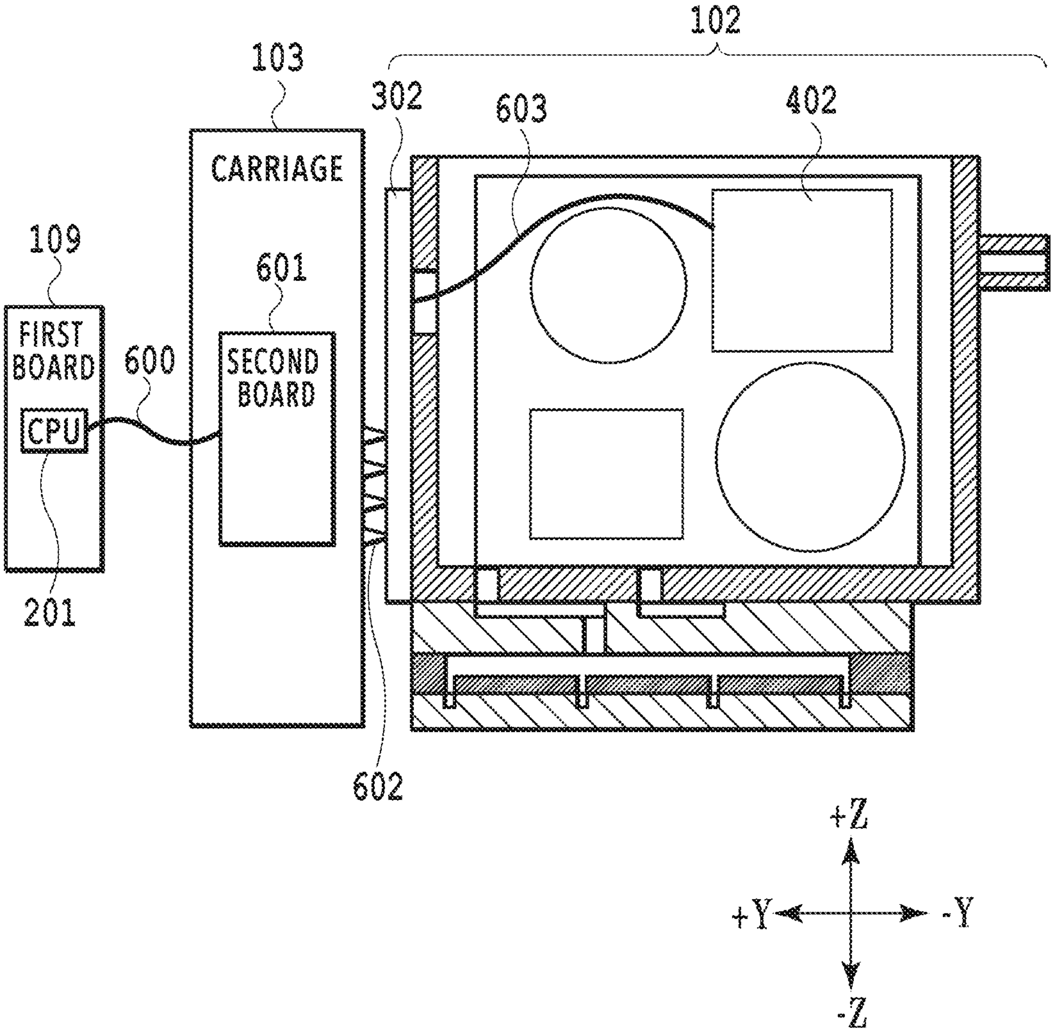
FIG. 6 is a schematic diagram of a circuit for driving a circulating pump which can be applied to one embodiment.

FIG. 6 is a schematic diagram showing a configuration for driving the circulating pump 402 which can be applied to the present embodiment.

As shown in FIG. 6, the CPU 201 is mounted on the first board 109. The carriage 103 includes a second board 601 in which electric wirings for various uses are routed. The CPU 201 and the second board 601 are connected via a first wiring 600. An example of the first wiring 600 includes FFC (Flexible Flat Cable). The second board 601 and the electric circuit board 302 are electrically connected via an electric connection part 602 with contact connection.

On the contact face of the electric circuit board 302, a terminal 800 (see FIG. 8) to which the electric connection part 602 can be connected is disposed. The electric circuit board 302 and the circulating pump 402 are electrically connected via a third wiring 603. The third wiring 603 is configured to be capable of supplying the electric power from the electric circuit board 302 to the circulating pump 402.

In the case where the ink is circulated, an electric signal (drive signal) for driving the circulating pump 402 is transmitted from the CPU 201 to the second board 601 via the first wiring 600. The drive signal transmitted to the second board 601 is transmitted to the electric circuit board 302 via the electric connection part 602. In addition, the circulating pump 402 is disposed inside the housing 301. In this way, the circulating pump 402 is disposed on a side closer to the housing 301 than the electric circuit board 302.

<Measure for Flame Retardancy>

In general, in the case where a circulating pump is disposed in a liquid ejecting head, it is difficult to increase the size of the circulating pump due to a restriction in size relative to the liquid ejecting head. Hence, there is a tendency that the voltage of the electric power to be supplied to the circulating pump becomes high in order to obtain a necessary circulation flow rate.

In the present embodiment, the circulating pump 402 is driven by supplying high-voltage current. Hence, a measure for flame retardancy is employed for the liquid ejecting head 102 of the present embodiment in order to stabilize the electrical connection.

Figure 7:
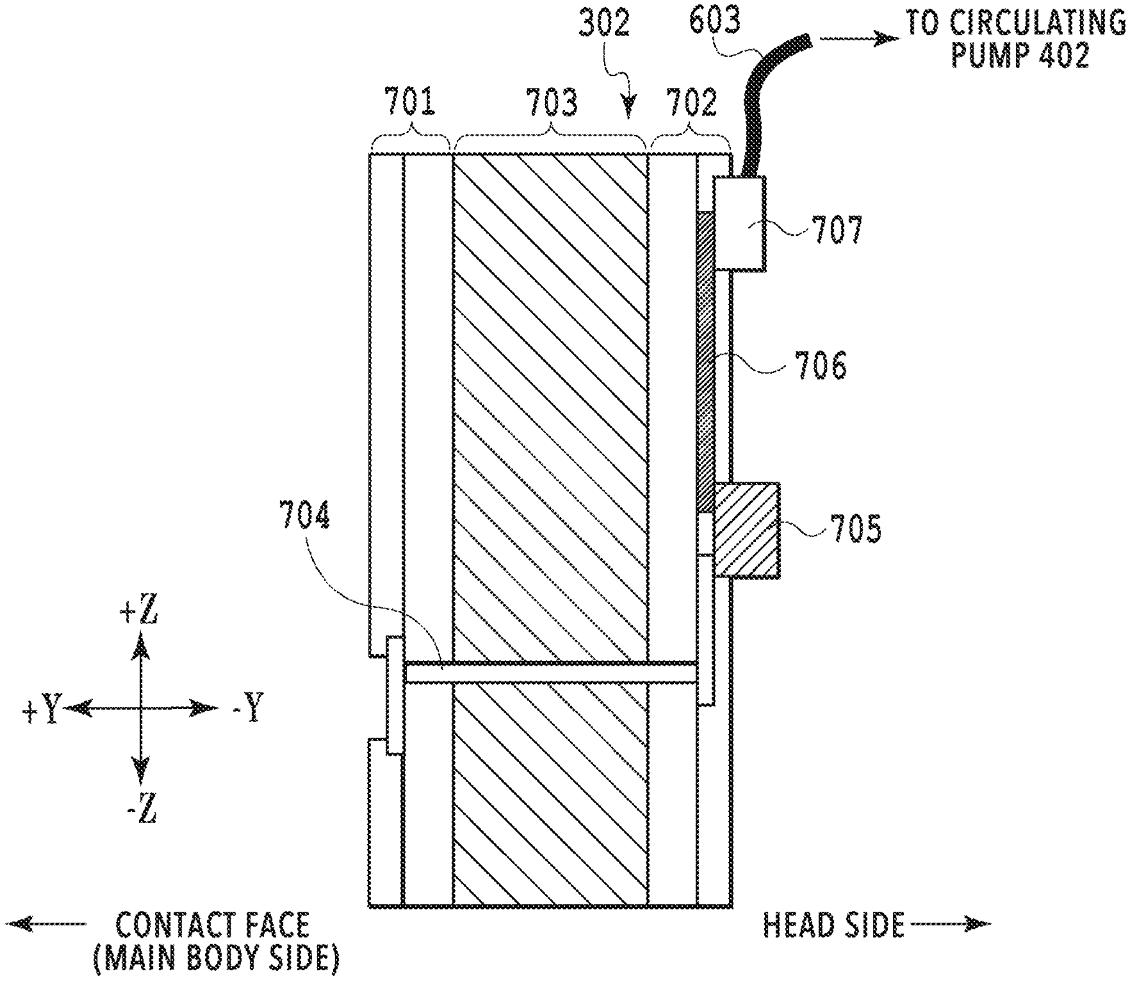
FIG. 7 is a schematic sectional diagram of an electric circuit board in one embodiment.

FIG. 7 is a schematic sectional diagram of the electric circuit board 302 in the present embodiment.

As shown in FIG. 7, the electric circuit board 302 is configured by interposing a plate-shaped core member 703 having flame retardancy between a first prepreg 701 formed of glass epoxy and a second prepreg 702 formed of glass epoxy.

In the present embodiment, "having flame retardancy" means that the flame retardant grade in the UL 94 standard is V-1 or more. For example, the core member 703 is configured to contain silicone, of which the flame retardant grade in the UL 94 standard is V-0, which is more excellent than V-1. Hence, the core member 703 can be said to have flame retardancy. Note that as long as the flame retardant grade in the UL 94 standard is V-1 or more, the material for forming the core member 703 is not limited to silicone.

In the state where the electric circuit board 302 is mounted on the housing 301 (see FIG. 3), the first prepreg 701 is disposed on a side closer to the main body of the liquid ejecting apparatus 100 (see FIG. 1) than the core member 703. On the other hand, in the state where the electric circuit board 302 is mounted on the housing 301 (see FIG. 3), the second prepreg 702 is disposed on a side closer to the housing 301 (head) than the core member 703.

In the core member 703, a via hole 704 which is capable of transmitting electric signals from the main body side to the head side across the core member 703 is formed. The via hole 704 is formed to penetrate the core member 703 in the Y direction in the state where the electric circuit board 302 is mounted on the housing 301 (see FIG. 3).

In the electric circuit board 302, a booster circuit 705 which is capable of boosting an input first voltage to a second voltage and a fourth wiring 706 to which the second voltage is applied are disposed on the side closer to the housing 301 (see FIG. 3) than the core member 703. In the present embodiment, the fourth wiring 706 is two-dimensionally routed. A connector 707 which connects the fourth wiring 706 and the third wiring 603 is also disposed on the side closer to the housing 301 (see FIG. 3) than the core member 703 on the electric circuit board 302. In this way, the booster circuit 705, the fourth wiring 706, and the connector 707 are disposed only on the side closer to the housing 301 (see FIG. 3) than the core member 703.

In the present embodiment, the via hole 704 is formed to be capable of inputting a drive signal for driving the circulating pump 402 into the booster circuit 705. In the case where the ink is circulated, the drive signal is transmitted from the CPU 201 (see FIG. 6) to the booster circuit 705 via the via hole 704. The drive signal input into the booster circuit 705 is transmitted to the connector 707 via the fourth wiring 706. The drive signal input into the connector 707 is transmitted to the circulating pump 402 via the third wiring 603. As mentioned above, the circulating pump 402 is driven by supply of the electric power having a relatively high voltage.

In the present embodiment, high voltage means 42.4 V (volt) or more. Specifically, the circulating pump 402 is driven by supply of the electric power with a voltage of 66 V or more. Hence, the booster circuit 705 is configured to be capable of boosting the voltage of the input drive signal from 5 V to 66 V and supplying the drive signal to the fourth wiring 706. That is, the fourth wiring 706 is a high-voltage wiring to which a voltage of 42.4 V or more is applied.

The electric circuit board 302 includes a control chip (not shown) for controlling the drive of the circulating pump 402 and a voltage-dividing circuit (not shown) which is capable of dividing the applied voltage into a predetermined voltage. In the electric circuit board 302, upon receipt of the drive signal for driving the circulating pump 402, the control chip outputs a booster signal for boosting the voltage from 5 V to 66 V to the booster circuit 705. The electric power having a voltage boosted to 66 V by the booster circuit 705 is supplied to the circulating pump 402 via the fourth wiring 706, the connector 707, and the third wiring 603.

Therefore, in the present embodiment, it is necessary to secure electrical safety on the head side in the electric circuit board 302 to which the electric power is supplied at high voltage.

Figure 8:
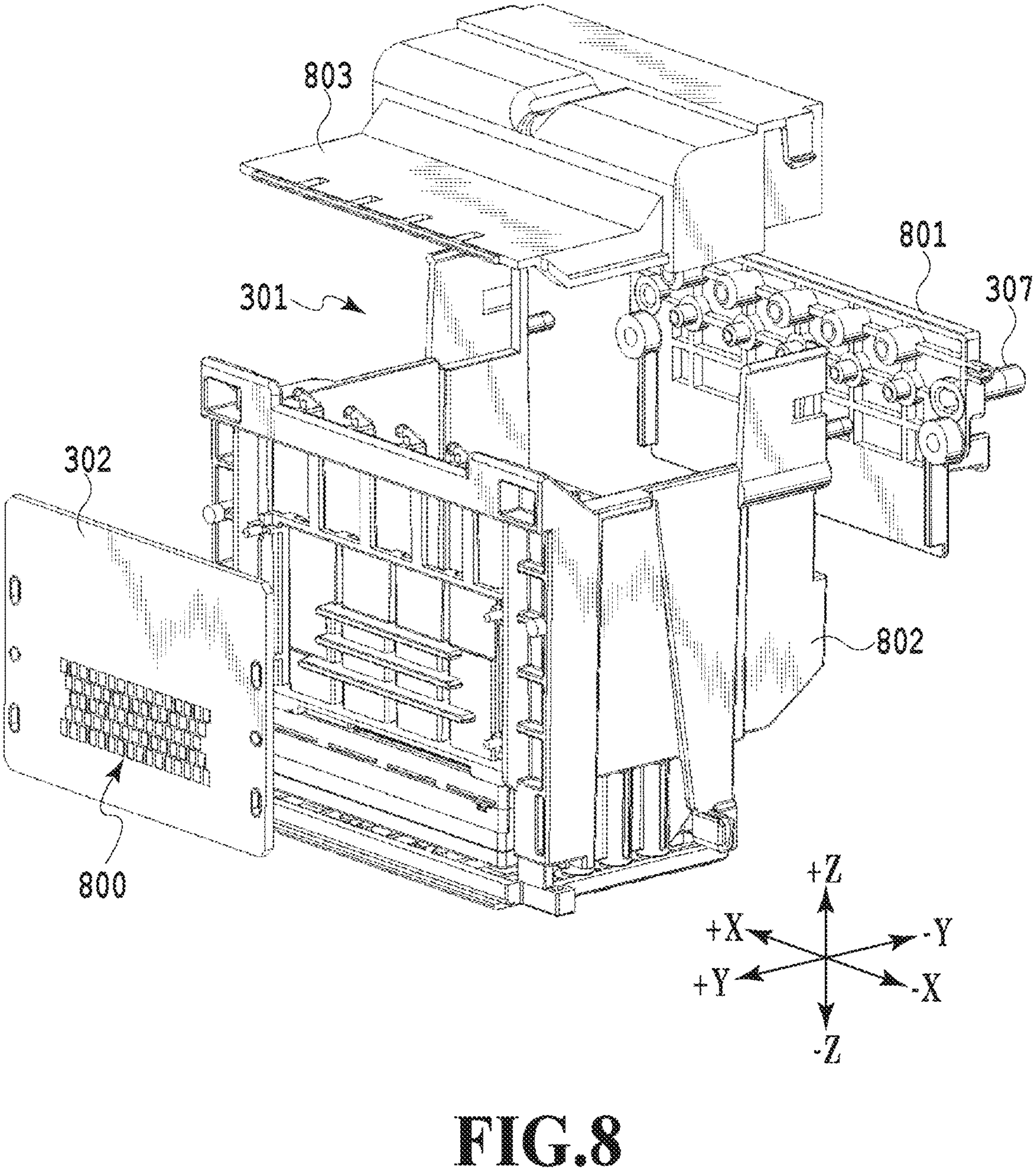
FIG. 8 is an exploded perspective diagram of the electric circuit board and members disposed around the electric circuit board.

FIG. 8 is an exploded perspective diagram showing the electric circuit board 302 and members disposed around the electric circuit board 302.

As shown in FIG. 8, the electric circuit board 302 is fixed to the housing 301. A terminal 800 to which the electric connection part 602 (see FIG. 6) can be connected is disposed on the contact face of the electric circuit board 302, which is directed in the opposite direction to the opposite face which is directed to the housing 301 in the state where the electric circuit board 302 is fixed to the housing 301. As the electric connection part 602 (see FIG. 6) is connected to the terminal 800, the drive signal transmitted from the CPU 201 (see FIG. 2) can be received.

The housing 301 includes a connection member 801 in which the connection parts 307 are formed, a support housing 802 for supporting the connection member 801, and a cover 803 which covers an upper portion of the circulating unit 106 (see FIG. 1).

The connection member 801, the support housing 802, and the cover 803 are formed of a resin of which the flame retardant grade in the UL 94 standard is V-1 or more. The material for forming the connection member 801, the support housing 802, and the cover 803 includes, for example, PPO (polyphenylene oxide), PS (polystyrene), PPE (polyphenyl ether), PPS (polyphenylene sulfide), and the like.

The connection member 801, the support housing 802, and the cover 803 are formed of, for example, a composite material composed of PPO and PS. The connection member 801, the support housing 802, and the cover 803 may be formed of a composite material composed of PPE and PS. The connection member 801, the support housing 802, and the cover 803 may be formed of a composite material composed of PPE and PPS.

In the support housing 802, a recess which is capable of covering the booster circuit 705 (see FIG. 7), the fourth wiring 706 (see FIG. 7), and the connector 707 (see FIG. 7) of the electric circuit board 302 is formed. With such a configuration, as the electric circuit board 302 is mounted on the support housing 802, a space formed by the core member 703 (see FIG. 7) and the support housing 802 is formed. Then, in the state where the electric circuit board 302 is mounted on the support housing 802, the booster circuit 705 (see FIG. 7), the fourth wiring 706 (see FIG. 7), and the connector 707 (see FIG. 7) are shielded inside the space. That is, as the electric circuit board 302 is mounted on the support housing 802, the members to which high voltage is applied are shielded by the core member 703 having flame retardancy (see FIG. 7) and the support housing 802. Therefore, even in a case where the electric power at high voltage is supplied to the electric circuit board 302, the flame retardancy on the side closer to the head than the core member 703 is secured.

Therefore, according to the liquid ejecting head of the present embodiment, electrical safety can be secured.

Moreover, as the booster circuit 705, the fourth wiring 706, and the connector 707 are disposed inside the space which is shielded by the members having flame retardancy, electrical safety on the side closer to the main body than the core member 703 can also be enhanced. In this case, it is preferable that the size of the via hole 704 be smaller than φ0.8. With such a configuration, even in a case where an unexpected event due to the fourth wiring 706 has occurred, it is possible to further suppress the event affecting from the head side to the main body side through the via hole 704.

In addition, in the electric circuit board 302, the members to which the electric power at high voltage is supplied are only disposed on the side closer to the head than the core member 703. Hence, the region where the measure for flame retardancy is necessary is limited to the side closer to the head than the core member 703. Therefore, it is also possible to reduce the cost required for the measure for flame retardancy as compared with the measure for flame retardancy that is applied to the entire electric circuit board 302.

Second Embodiment

Hereinafter, a second embodiment in the technique of the present disclosure will be described with reference to the drawings. A difference between the liquid ejecting head in the first embodiment and the liquid ejecting head in the present embodiment is the arrangement of high-voltage wirings. In the following description, configurations similar or corresponding to those of the first embodiment will be denoted by the same reference signs and the description thereof will be omitted, and different points will be mainly described.

Figure 9:
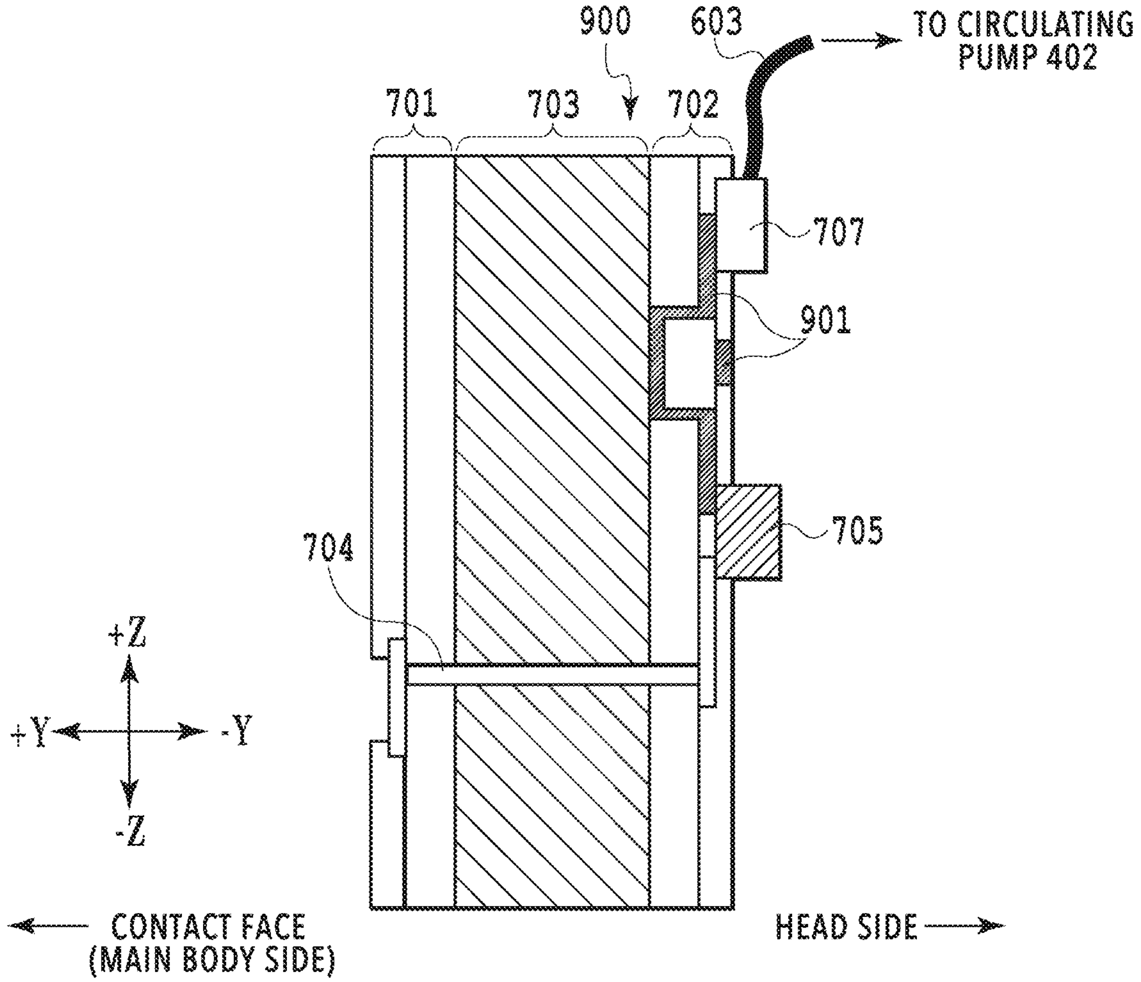
FIG. 9 is a schematic sectional diagram of an electric circuit board which can be applied to one embodiment.

FIG. 9 is a schematic sectional diagram in a second electric circuit board 900 which can be applied to the present embodiment.

As shown in FIG. 9, the second electric circuit board 900 includes a fifth wiring 901 which is connected to the booster circuit 705 and to which the electric power of 66 V is applied. The fifth wiring 901 is three-dimensionally routed only on the side closer to the housing 301 (see FIG. 3) (head) than the core member 703. With such routing, since there is a portion where the wiring is routed inside the second electric circuit board 900, the flame retardancy is improved as compared with the fourth wiring 706 (see FIG. 7) which is two-dimensionally routed.

Hence, according to the liquid ejecting head in the present embodiment, it is possible to reduce a possibility that an unexpected event which would occur due to the fifth wiring 901 as compared with the first embodiment.

Third Embodiment

Hereinafter, a third embodiment in the technique of the present disclosure will be described with reference to the drawings. In the liquid ejecting head in the present embodiment, a further measure for flame retardancy is applied to the first and second embodiments. In the following description, configurations similar or corresponding to those of the first and second embodiments will be denoted by the same reference signs and the description thereof will be omitted, and different points will be mainly described.

Figure 10:
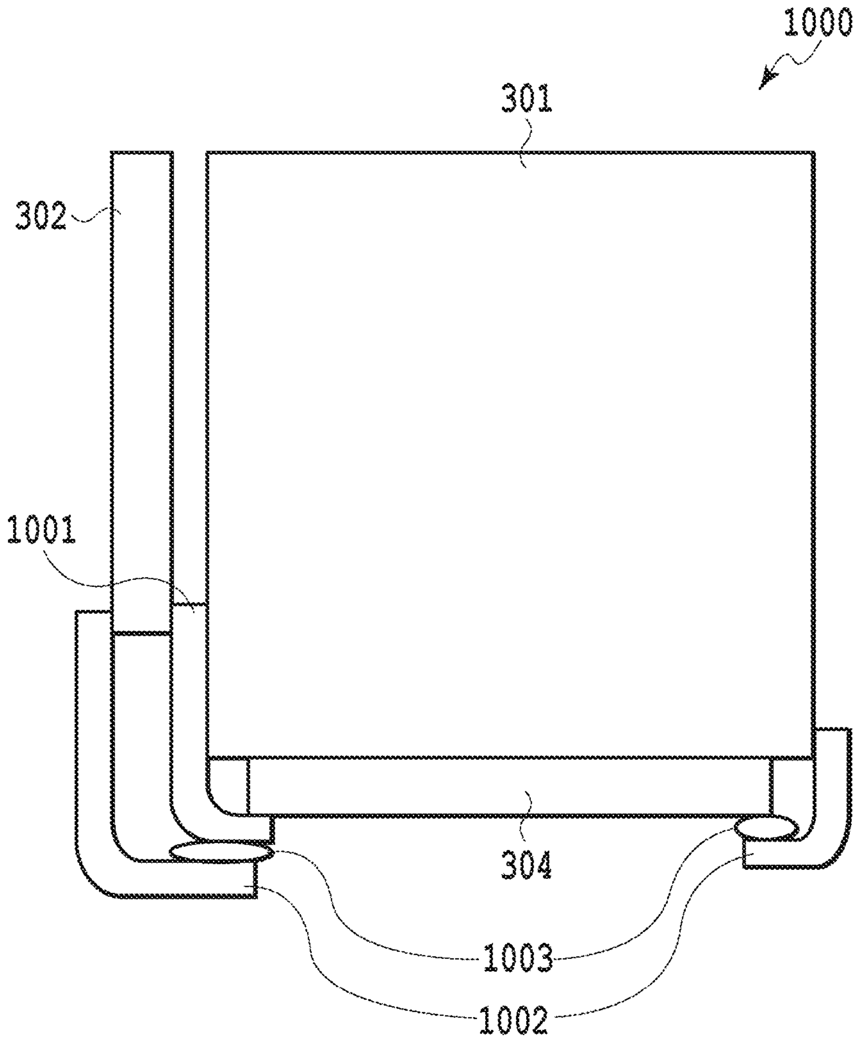
FIG. 10 is a schematic sectional diagram of a liquid ejecting head which can be applied to one embodiment.

FIG. 10 is a schematic sectional diagram in a second liquid ejecting head 1000 which can be applied to the present embodiment.

As shown in FIG. 10, the second liquid ejecting head 1000 includes a sixth wiring 1001 which electrically connects the electric circuit board 302 and the element substrate 304. An example of the sixth wiring 1001 includes FPC (Flexible printed circuit).

The second liquid ejecting head 1000 includes a flame retardant member 1002 which is capable of covering an outer side of the electric circuit board 302. Between the sixth wiring 1001 and the flame retardant member 1002, a sealing member 1003 which is capable of sealing a gap generated in between is disposed. Note that a gap generated between the element substrate 304 and the flame retardant member 1002 is also sealed by the sealing member 1003. The flame retardant member 1002 and the sealing member 1003 are formed of a material of which the flame retardant grade in the UL 94 standard is V−1 or more.

Although described later in detail, in the present embodiment, a voltage of 42.4 V or more is applied to the sixth wiring 1001. The sixth wiring 1001 is disposed on the side closer to the above-mentioned housing 301, which has flame retardancy, than the electric circuit board 302. Then, an outer side of the sixth wiring 1001 is covered with the sealing member 1003, the electric circuit board 302, and the flame retardant member 1002.

Figure 11:
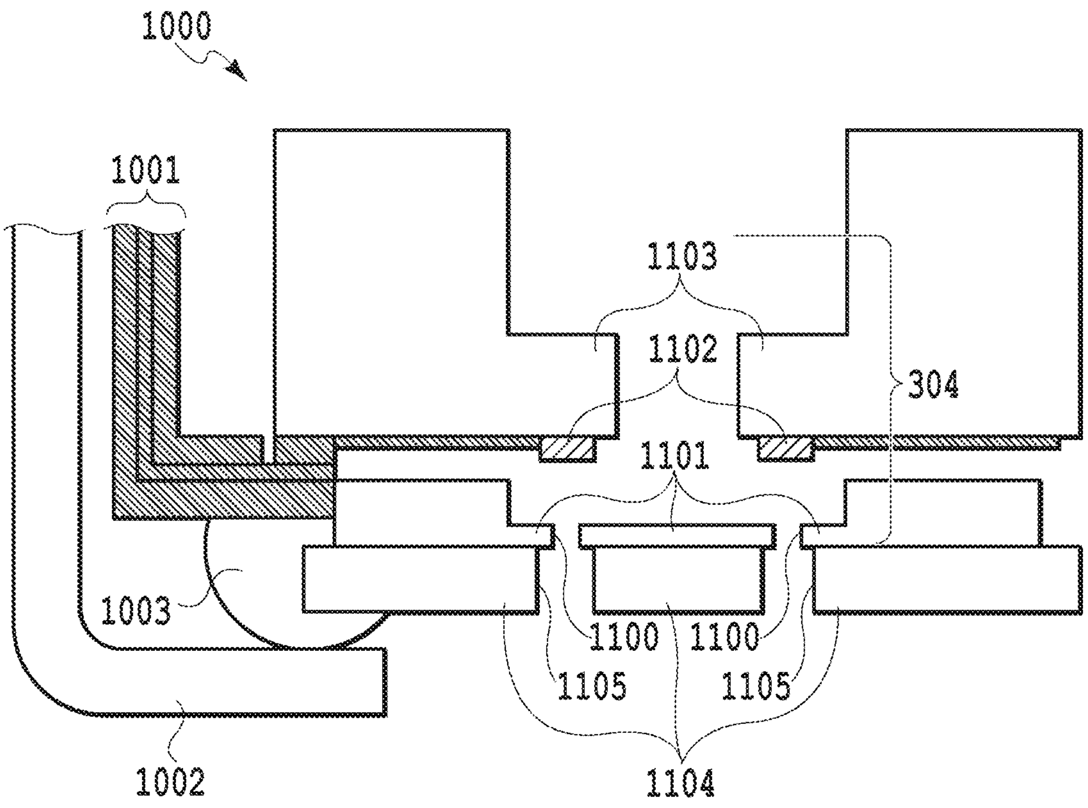
FIG. 11 is an enlarged sectional diagram near ejection nozzles in one embodiment.

FIG. 11 is an enlarged sectional diagram near ejection nozzles in the present embodiment.

As shown in FIG. 11, the element substrate 304 includes an ejection nozzle forming member 1101 in which a plurality of ejection nozzles 1100 are formed and energy generating elements 1102 which are disposed at positions corresponding respectively to the ejection nozzles 1100 and which generate energy to be used for ejecting the ink. The element substrate 304 also includes a flow passage member 1103 in which a flow passage capable of supplying the ink to the ejection nozzle forming member 1101 is formed.

On the other hand, to a lower face of the ejection nozzle forming member 1101, a flame retardant plate 1104 of which the flame retardant grade in the UL 94 standard is V−1 or more is joined. In the flame retardant plate 1104, through-holes 1105 for preventing the outflow of the ink ejected from the ejection nozzles 1100 from being inhibited are formed. The flame retardant plate 1104 and the sixth wiring 1001 are joined via the sealing member 1003.

In the present embodiment, heaters which generate heat upon application of a predetermined voltage can be used as the energy generating elements 1102. The heaters in the present embodiment are disposed on the side closer to the housing 301 than the electric circuit board 302 (see FIG. 10). Then, the heaters in the present embodiment are driven by receiving electric signals (ejection signals) for ejecting the ink. Specifically, the heaters in the present embodiment are driven by supply of the electric power at 60.0 V on direct current or 42.4 V on alternating current. Hence, voltage of at least 42.4 V is applied to the sixth wiring 1001 which is electrically connected to the energy generating element 1102. Therefore, in the present embodiment, a measure for flame retardancy is applied to the sixth wiring 1001.

Specifically, as shown in FIG. 10, the sixth wiring 1001 is disposed on the side closer to the housing 301 than the electric circuit board 302. Then, the outer side of the sixth wiring 1001 is covered with the flame retardant plate 1104 (see FIG. 11), the sealing member 1003, and the flame retardant member 1002 as shown in FIG. 11. In this way, as the sixth wiring 1001 is shielded by the members having flame retardancy, the flame retardancy of the second liquid ejecting head 1000 is improved.

Therefore, according to the second liquid ejecting head 1000, the electrical safety can be enhanced more than the first embodiment. Note that the ejection nozzle forming member 1101 may be formed of a material of which the flame retardant grade in the UL 94 standard is V-1 or more. In this case, the electrical safety can be further improved.

Other Embodiments

The fourth wiring 706 (see FIG. 7) may be shielded by a film formed of a material of which the flame retardant grade in the UL 94 standard is V-1 or more. Note that in this case, the housing 301 does not have to have flame retardancy. With such a configuration as well, the fourth wiring 706 is shielded by the core member 703 having flame retardancy and the film having flame retardancy, so that the electrical safety can be improved.

The fifth wiring 901 (see FIG. 9) may be shielded by a film formed of a material of which the flame retardant grade in the UL 94 standard is V-1 or more. Note that in this case, the housing 301 does not have to have flame retardancy. With such a configuration as well, the fifth wiring 901 is shielded by the core member 703 having flame retardancy and the film having flame retardancy, so that the electrical safety can be improved.

In the first, second, and third embodiments, a so-called thermal method which ejects a liquid by generating bubbles by using heaters has been employed. However, the technique of the present disclosure can also be applied to liquid ejecting heads employing a piezoelectric method, and other various liquid ejecting methods.

According to the liquid ejecting head of the present disclosure, the electrical safety can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-144285, filed Sep. 6, 2023, which is hereby incorporated by reference herein in its entirety.

What is claimed is:

1. A liquid ejecting head capable of ejecting a liquid, comprising:

a storage unit capable of storing the liquid;

an element substrate which includes a plurality of ejection nozzles for ejecting the liquid supplied from the storage unit;

a drive unit configured to drive the element substrate, and which is supplied with electric power at a predetermined voltage;

a housing configured to support the element substrate, the storage unit, and the drive unit;

an electric circuit board in which a high-voltage wiring to which the predetermined voltage is applied is disposed; and a flame retardant portion which has a flame retardant grade of V-1 or more, wherein the electric circuit board includes a core member which has a flame retardant grade of V-1 or more, the flame retardant portion is disposed on a side closer to the housing than the electric circuit board, and the high-voltage wiring is disposed between the core member and the flame retardant portion.

2. The liquid ejecting head according to claim 1, wherein the flame retardant portion is a film, and the high-voltage wiring is shielded by the film.

3. The liquid ejecting head according to claim 1, wherein the flame retardant portion is a part of the housing, and the high-voltage wiring is shielded by the electric circuit board and the part of the housing.

4. The liquid ejecting head according to claim 1, wherein in the electric circuit board, the high-voltage wiring is two-dimensionally routed on a side closer to the housing than the core member.

5. The liquid ejecting head according to claim 1, wherein in the electric circuit board, the high-voltage wiring is three-dimensionally routed on a side closer to the housing than the core member.

6. The liquid ejecting head according to claim 1, wherein in the electric circuit board, a booster circuit which boosts an input voltage to the predetermined voltage and a connector to which a wiring for supplying the electric power to the drive unit is connected are further disposed on a side closer to the housing than the core member, and the high-voltage wiring connects the booster circuit and the connector.

7. The liquid ejecting head according to claim 1, wherein the electric circuit board has:

a contact face on which a terminal which is capable of receiving an electric signal is disposed; and a via hole which is capable of transmitting the electric signal from the contact face to the housing side across the core member.

8. The liquid ejecting head according to claim 7, wherein a diameter of the via hole is smaller than φ0.8.

9. The liquid ejecting head according to claim 1, wherein the drive unit is a pump which is capable of circulating the liquid between the storage unit and the element substrate, and to the high-voltage wiring, the predetermined voltage which is capable of driving the pump is applied.

10. The liquid ejecting head according to claim 9, wherein the storage unit and the pump are shielded by the housing.

11. The liquid ejecting head according to claim 9, wherein the predetermined voltage is 42.4 V or more.

12. The liquid ejecting head according to claim 1, wherein the drive unit comprises energy generating elements which are formed at positions corresponding respectively to the plurality of ejection nozzles and which are capable of generating energy to be used for ejecting the liquid upon receipt of an ejection signal for ejecting the liquid, and to the high-voltage wiring, the predetermined voltage which is capable of driving the energy generating elements is applied.

13. The liquid ejecting head according to claim 12, further comprising:

a flame retardant member which has a flame retardant grade of V-1 or more; and a sealing member which has a flame retardant grade of V-1 or more, wherein the high-voltage wiring connects the electric circuit board and the element substrate, the electric circuit board and the high-voltage wiring are covered with the flame retardant member, and a gap between the high-voltage wiring and the flame retardant member is covered with the sealing member.

14. The liquid ejecting head according to claim 12, further comprising:

a flame retardant plate which has a flame retardant grade of V-1 or more, wherein the flame retardant plate is connected to an ejection nozzle forming member in which the plurality of ejection nozzles are formed.

15. The liquid ejecting head according to claim 14, wherein a flame retardant grade of the ejection nozzle forming member is V-1 or more.

16. A liquid ejecting apparatus comprising:

a liquid ejecting head which includes a storage unit capable of storing a liquid, an element substrate which includes a plurality of ejection nozzles for ejecting the liquid supplied from the storage unit, a drive unit which is supplied with electric power at a predetermined voltage to drive the element substrate in order to eject the liquid, a housing which supports the element substrate, the storage unit, and the drive unit, an electric circuit board in which a high-voltage wiring to which the predetermined voltage is applied is disposed, and a flame retardant portion which has a flame retardant grade of V-1 or more; and a control unit configured to control the liquid ejecting head, wherein the electric circuit board includes a core member which has a flame retardant grade of V-1 or more, the flame retardant portion is disposed on a side closer to the housing than the electric circuit board, and the high-voltage wiring is disposed between the core member and the flame retardant portion.

* * * * *